United States Patent
Kojima

[11] Patent Number: 5,875,453
[45] Date of Patent: Feb. 23, 1999

[54] APPARATUS FOR AND METHOD OF INFORMATION PROCESSING

[75] Inventor: Nobuyuki Kojima, Yokohama, Japan

[73] Assignee: Canon Kabushiki Kaisha, Tokyo, Japan

[21] Appl. No.: 685,935

[22] Filed: Jul. 22, 1996

[30] Foreign Application Priority Data

Jul. 25, 1995 [JP] Japan ................................ 7-189231

[51] Int. Cl.$^6$ .................................................... G06F 13/00
[52] U.S. Cl. .............................. 711/112; 711/213; 711/4
[58] Field of Search ................................ 711/112, 113, 711/204, 4, 213

[56] References Cited

U.S. PATENT DOCUMENTS

| | | | |
|---|---|---|---|
| 4,972,364 | 11/1990 | Barrett | 711/117 |
| 5,146,578 | 9/1992 | Zangehpour | 711/137 |
| 5,257,370 | 10/1993 | Letwin | 711/113 |
| 5,305,389 | 4/1994 | Palmer | 382/305 |
| 5,410,643 | 4/1995 | Macon, Jr. | 711/113 |
| 5,522,054 | 5/1996 | Gunlock | 711/112 |
| 5,566,315 | 10/1996 | Milillo | 711/113 |
| 5,574,881 | 11/1996 | Yasuoka | 711/112 |

*Primary Examiner*—Tod R. Swann
*Assistant Examiner*—Christopher S. Chow
*Attorney, Agent, or Firm*—Fitzpatrick, Cella, Harper & Scinto

[57] ABSTRACT

An apparatus for and a method of information processing which enable higher execution efficiency. Data lengths read from a recorder/reproducer in accordance with read requests received from a host computer are stored in a RAM. The number of the read requests is counted, and the number of times each data is acquired is counted according to the acquired data lengths. When a predetermined number of read requests has been counted, a pre-read quantity is determined, according to the result of acquisition number of times and the pre-read quantity is stored in a cache memory. Control is carried out so that data is read in a length obtained by adding the pre-read quantity to the data length read according to a read request received after the predetermined number of times.

12 Claims, 3 Drawing Sheets

APPARATUS FOR AND METHOD OF INFORMATION PROCESSING

BACKGROUND OF THE INVENTION

1. Field of the Invention

The present invention relates to an apparatus for and a method of information processing for reading data from a storage medium in accordance with a read request.

2. Related Background Art

When a host computer reads data in succession from a magnetic disk in a magnetic disk drive, it is very likely that the data to be read successively is also stored at successive locations in the magnetic disk. In general, according to a communication protocol in SCSI, IDE, etc., used between a host computer and a magnetic disk drive, executing one read processing requires a command including such information as an address, actual data, and a status including information indicating whether the processing has been successful or unsuccessful be accessed in sequence. This unavoidably includes wasteful reading time spent for accessing a command and status which are irrelevant to the actual data transfer. Furthermore, when consecutive read commands are issued from the host computer, time is spent for accessing the status of a certain number of processing and a command of the following number of processing while the consecutive data is being transferred.

In such access processing, data is read from a memory as follows: desired data, which has been stored at a predetermined location in the magnetic disk is read by moving the reading head in the magnetic disk drive. At this time, the reading head continues to move even after reading the data. Hence, when the command for consecutive reading as mentioned above is executed, the reading head will have already moved to the center of the disk or out of the disk even if the data of the next read request immediately follows the data of the previous reading. Therefore, the reading head has to be moved to the location of the data required for the next read request in order to execute the following read request (this operation will be hereinafter referred to as a "seek"), or the system must wait until the required data comes under the reading head if the magnetic disk has already rotated and the required data has gone away from the reading head (this operation will be hereinafter referred to as "rotational delay"). In either case, the result is a time loss.

To prevent such time loss in successive reading, in the actual reading in the magnetic disk drive, instead of reading only the data required for the instant read request, a predetermined quantity of extra data adjacent to that data is read and the predetermined quantity of the extra data, which has been read, is stored in a storage medium such as a buffer memory. This means that, even if the data required for a certain read request is positioned at a location continuous to the data which has been used for the preceding read request, the required data will have been stored in a buffer memory or other storage medium when the processing based on the preceding read request is being carried out. This function, which enables a quick response to a request from the host computer by eliminating the need for the reading head to perform the wasteful seek or to incur the rotational delay, has been provided in a magnetic disk drive apparatus. Such a function is known as a pre-reading function.

For instance, a magnetic disk drive which employs a magnetic disk having concentric tracks has been designed to pre-read one track of data so as to avoid the time loss resulting from the reading head which moves from one track to another.

However, the magnetic disk drive apparatus equipped with the pre-reading function described above has been posing the following problems:

1. During pre-reading, if a read request is received which requires data other than the data to be pre-read, the magnetic disk drive apparatus immediately interrupts the pre-reading and executes seek in response to the new command. This has been problematic in that it causes a time loss resulting from the interruption of the pre-reading with a consequent delay in executing the new command. For this reason, a small quantity of data has conventionally been set for such pre-reading so as to quickly complete pre-reading and begin work on the next request.

2. There has been another problem in that, if there is more data required for the following read request than the data to be secured by pre-reading, then the data which is obtained by pre-reading is insufficient for the read request and therefore, additional processing must be implemented to read the rest of the data which is not covered by the data which has been pre-read.

To be more specific, host computers generally access magnetic disk drives on the basis of a predetermined amount of data (hereinafter referred to as "cluster size") known as a logical size (an integral multiple of sector size) which is different from the physical sector size set in the magnetic disk of the magnetic disk drive. The host computers manage the data in the magnetic disks by cluster size. Hence, every access request issued from the host computers to the magnetic disk drives is based on an integral multiple of the cluster size. For this reason, if the pre-read quantity is set smaller than the cluster size, then even if the data secured by pre-reading is supposed to be used for a certain request, the data will not include all the data necessary for the request, necessitating regular reading after all.

Thus, pre-reading the data in a size smaller than the cluster size inevitably involves a processing time loss. Furthermore, because the magnetic disk drives are not capable of determining the cluster size of the host computers, they are not able to decide an effective size of data required for pre-reading. For this reason, the amount of data to be pre-read has traditionally been set larger than the cluster size in order to secure a sufficient quantity of data.

As described above, the solutions to the problems with pre-reading shown in 1 and 2 above have been conflicting with each other. To cope with the conflict, in conventional magnetic disk drives, an appropriate quantity of data to be pre-read has been set to ensure a balance. This has been no more than just an attempt to achieve an appropriate balance between the continuous reading of a given data size, wherein the data secured by pre-reading is continued to be used, and the random reading, wherein the data secured by pre-reading is not used. This has led to a problem in that the processing execution efficiency drops in some cases of reading.

SUMMARY OF THE INVENTION

The present invention has been made with a view toward solving the problems described above, and it is an object of the invention to provide an apparatus for and a method of information processing with higher execution efficiency.

To this end, according to the invention, there is provided an information processing apparatus for reading data from a storage medium in accordance with a read request, comprising: acquiring means for acquiring the data length read from the storage medium according to the read request; first counting means for counting the number of the read requests; second counting means for counting the number of times each data is acquired according to the data length acquired by the acquiring means; deciding means for deciding a pre-read quantity according to a result supplied by the second counting means when the first counting means has counted a predetermined number of times; and controlling means for performing control so that data is read in a data length which is obtained by adding the pre-reading quantity to the data length which is read in response to a read request received after the predetermined number of times.

DESCRIPTION OF THE PREFERRED EMBODIMENT

The preferred embodiment of the present invention will now be described in detail with reference to the accompanying drawings.

Figure 1:
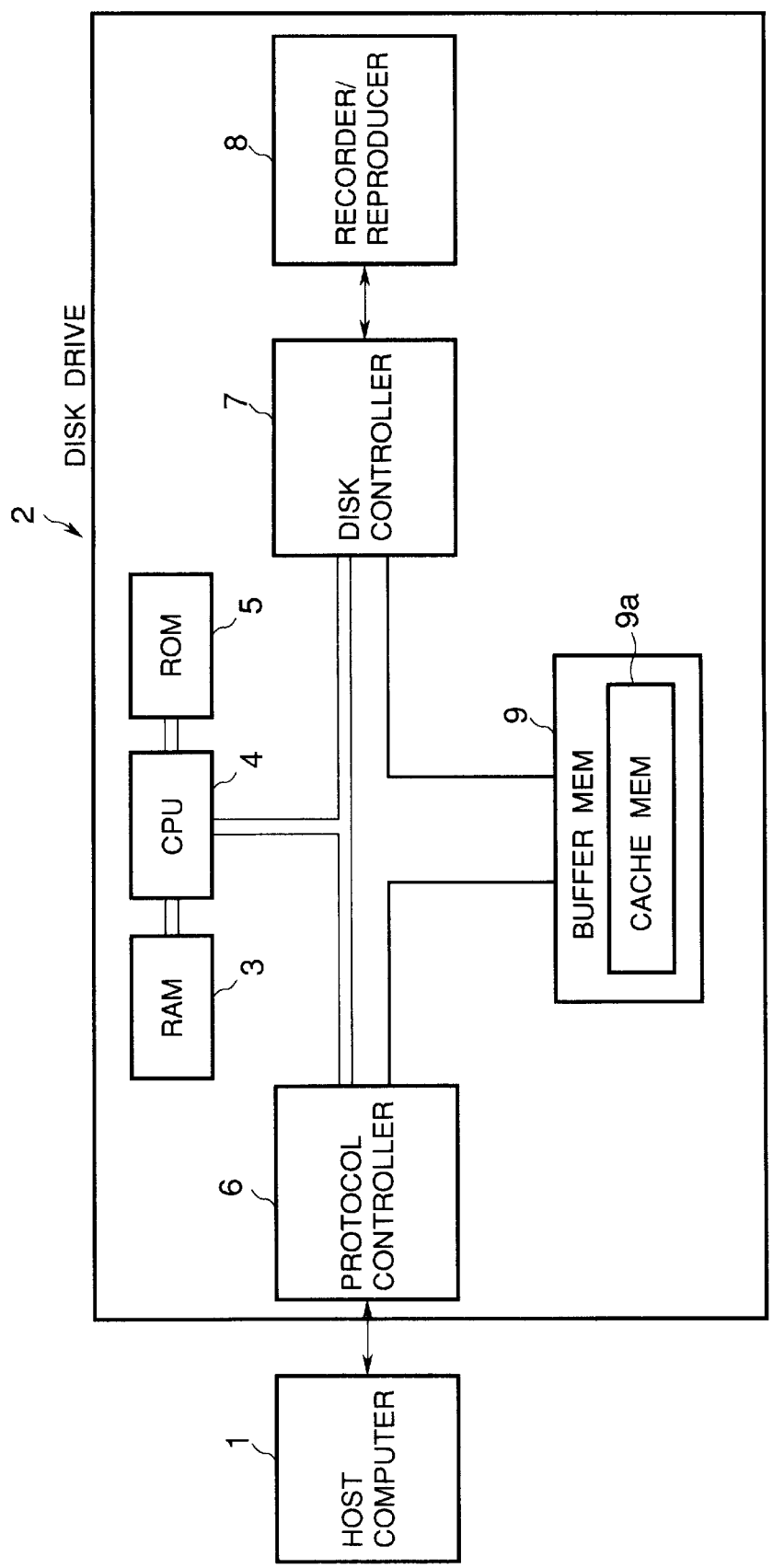
FIG. 1 is a block diagram showing a functional configuration of a magnetic disk drive of an embodiment according to the present invention.

FIG. 1 is a block diagram showing the functional configuration of a magnetic disk drive of the embodiment.

A host computer 1 issues a write command for writing data to a magnetic disk drive 2 or a read command for reading data from the magnetic disk drive 2.

The disk drive 2 includes a RAM 3, a CPU 4, a ROM 5, a protocol controller 6, a device controller 7, a recorder/reproducer 8, and a buffer memory 9.

The RAM 3 serves as a work area or a temporary save area for the data which is received from the host computer 1 and stored in a cache memory 9a built in the buffer memory 9 or the data read from the recorder/reproducer 8.

The CPU 4 controls the RAM 3, the ROM 5, the protocol controller 6, the device controller 7, the recorder/reproducer 8, and the buffer memory 9 in accordance with the programs stored in the ROM 5.

The ROM 5 stores various programs for processing the data received from the host computer 1 or the data read from the magnetic disk included in the recorder/reproducer 8. A program for a processing flow, which will be discussed later, can be written and the written program can be read into the RAM 3 of an apparatus of the embodiment to execute processing.

The protocol controller 6 controls the interface between the host computer 1 and the magnetic disk drive 2. The device controller 7 controls the recorder/reproducer 8 which reads data and writes data.

The recorder/reproducer 8 represents the mechanism for recording and reproducing data to and from a disk. The magnetic disk used in this embodiment has a spiral structure, so that mechanical operation exerts no influence on reading time. In this case, the time required for pre-reading is proportional to the read quantity.

The buffer memory 9 is used for temporarily storing commands or data received from the host computer 1; it includes the cache memory 9a to store the data or the like obtained in the work area of the RAM 3.

The processing flow according to the embodiment having the aforesaid configuration will now be described with reference to the flowchart shown in FIG. 2.

Figure 2:
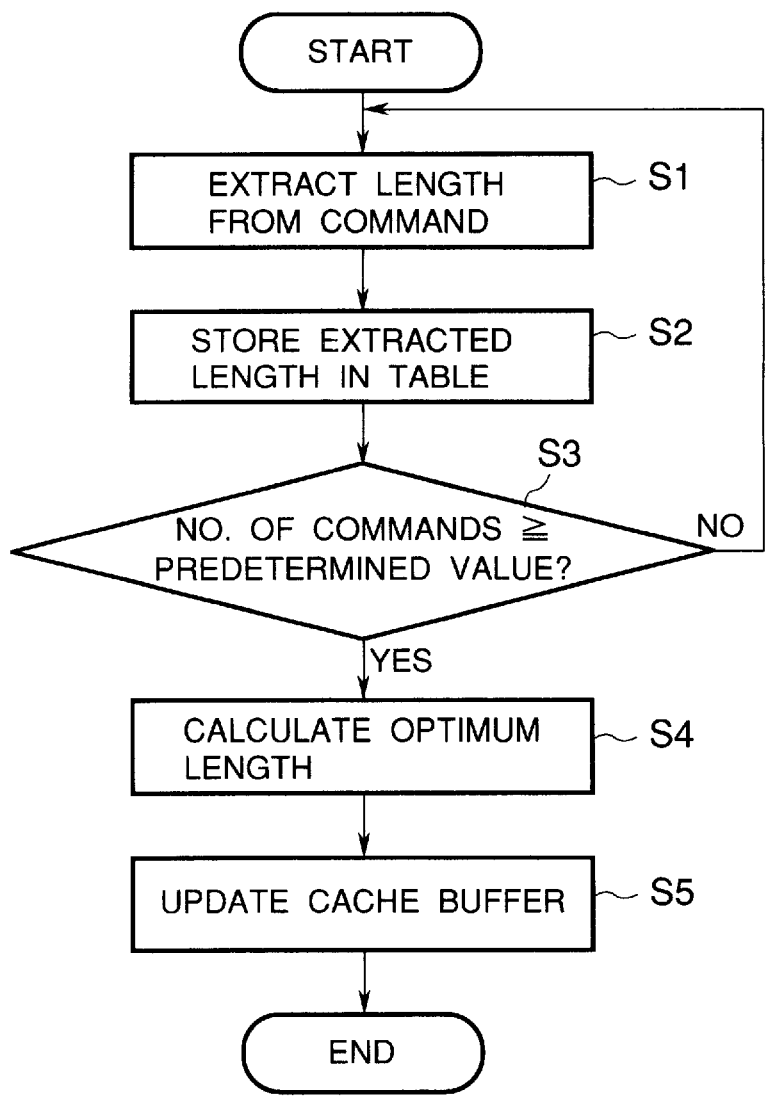
FIG. 2 is a flowchart showing a processing flow of the embodiment.

FIG. 2 shows the flowchart of the processing flow of the embodiment.

It is assumed that the magnetic disk drive does not perform pre-reading immediately after the power of the host computer 1 is turned ON or reset is engaged by the host computer 1. When the host computer 1 is turned ON or reset is engaged, each time a command request is received from the host computer 1, the length or the sector size of each command is extracted to create a table which indicates the distribution of the frequency of use of the extracted length. It is also assumed that a pre-read quantity established before reset has been stored in the cache memory 9a.

In a step S1, the host computer 1 is turned ON or reset is engaged and the host computer 1 sends a command request to the magnetic disk drive 2. As soon as the magnetic disk drive 2 receives the command request, it extracts the length or the number of sectors in the command. In a step S2, the extracted length is stored in the table which is stored in a predetermined area of the RAM 3.

Figure 3:
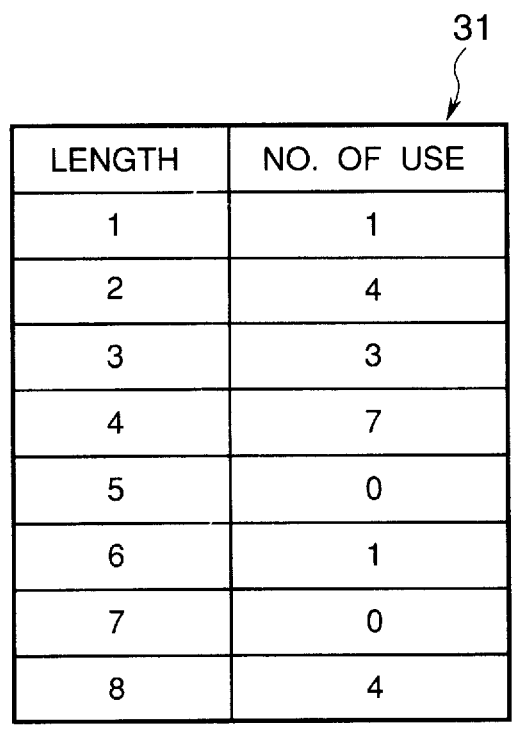
FIG. 3 is a diagram showing a table generated in a predetermined area of an RAM of the embodiment.

In a step S3, the system decides whether a predetermined number of commands has been received from the host computer 1. If the system decides that the predetermined number of commands has not yet been received, that is, if the result in the step S3 is negative, then it goes back to the step S1 to repeat the processing from the steps S1 through S3, thereby updating the table until the predetermined number of commands is received. For example, if the predetermined number of commands is 20, then a table 31 indicating the lengths and the number of uses of the lengths shown in FIG. 3 is created in a predetermined area of the RAM 3.

When the predetermined number of commands has been received, that is, when the commands have been received twenty times (the result in the step S3 is affirmative), then the system advances to a step S4.

In the step S4, an optimum value of length is calculated using the table 31. The optimum value is obtained by extracting from the table 31 the lengths whose number of uses is the predetermined number or greater, and by deciding the least common multiple of the extracted lengths. For instance, the least common multiple of the lengths which are used four or more times in FIG. 3 will be determined as follows: the lengths which are used four or more times are 2, 4 and 8; the least common multiple of these three lengths is calculated. The calculation result indicates that the length of the least common multiple is 8.

In a step S5, the pre-read quantity which was used before the reset is erased and the new calculated length is stored as the updated pre-read quantity, which has the optimum sector size, in the cache memory 9a. This pre-read quantity stored in the cache memory 9a is used until another reset is engaged by the host computer 1.

In the embodiment, once the pre-read quantity is decided, the decided pre-read quantity is used for pre-reading until another reset is engaged. As an alternative, however, the pre-read quantity, which had been set in the cache memory 9a before reset, may be used from the moment the reset is engaged until the predetermined number of commands is received again.

Thus, the embodiment is designed to set the least common multiple of the lengths which are used, often so that a length which is frequently used can be secured as a pre-read quantity, thereby permitting higher execution efficiency of the apparatus even when read requests are issued in succession.

In the method for deciding the optimum pre-read quantity according to this embodiment, the least common multiple of the lengths which are used not less than a predetermined number is adopted as the optimum value; however, the present invention is not restricted thereto. As an alternative, for example, the optimum pre-read quantity may be the difference between the length with the highest frequency of use and the length with the next highest frequency of use. As another alternative, the length which is most frequently used may be employed as the optimum pre-read quantity.

Likewise, in this embodiment, the optimum pre-read quantity has been calculated using the table which indicates the lengths obtained by receiving twenty commands from the host computer 1 and the number of times the lengths are used; however, the present invention is not limited thereto. For instance, any number of commands desired by a user may be easily set. The same applies to the number of times the lengths are used, based on which the least common multiple is calculated.

In addition, the present invention may be applied to a system constituted by a plurality of devices or an apparatus comprised of a single device. The invention may apparently be applied also to a case wherein the invention is implemented by supplying a program to a system or apparatus. In such a case, the system or apparatus is operated in a preestablished manner by reading the program, which is represented by software for implementing the invention, from a storage medium, wherein the program has been stored, to the system or apparatus.

Thus, the present invention provides an apparatus for and a method of information processing which permit higher execution efficiency.

What is claimed is:

1. An information processing apparatus for reading data from a storage medium in response to a read request, comprising:

acquiring means for acquiring a length of the data read from the storage medium in response to the read request;

first counting means for counting the number of the read requests;

second counting means for counting the number of times data is acquired for each of the data lengths acquired by said acquiring means;

deciding means for deciding a pre-read quantity based on a result supplied by said second counting means when said first counting means has counted a predetermined number of times; and controlling means for performing control so that data is read in a data length obtained by adding the pre-read quantity decided by said deciding means to the data length read in response to a read request received after the predetermined number of times.

2. An information processing apparatus according to claim 1, wherein said deciding means further comprises determining means for determining the data length which is acquired a predetermined number of times or more by said acquiring means, the pre-read quantity being decided by a least common multiple of the data lengths determined by said determining means.

3. An information processing apparatus according to claim 1, wherein said deciding means decides the pre-read quantity according to the difference between a data length which has the largest acquisition number of times and a data length which has the next largest acquisition number of times among the acquisition numbers of times counted by said second counting means.

4. An information processing apparatus according to claim 1, wherein said deciding means decides the pre-read quantity according to a data length which has the largest acquisition number of times among the acquisition numbers of times counted by said second counting means.

5. An information processing method for reading data from a storage medium according to a read request, comprising:

an acquiring step for acquiring a length of the data read from the storage medium in response to the read request;

a first counting step for counting the number of the read requests;

a second counting step for counting the number of times data is acquired for each of the data lengths acquired in said acquiring step;

a deciding step for deciding a pre-read quantity based on a result supplied in said second counting step when a predetermined number of times has been counted in said first counting step; and a controlling step for performing control so that data is read in a data length obtained by adding the pre-reading quantity decided in said deciding step to the data length read in response to a read request received after the predetermined number of times.

6. An information processing method according to claim 5, wherein said deciding step further comprises determining the data length which is acquired a predetermined number of times or more in said acquiring step, the pre-read quantity being decided by a least common multiple of the data lengths determined in said determining step.

7. An information processing method according to claim 5, wherein said deciding step includes deciding the pre-read quantity according to the difference between a data length which has the largest acquisition number of times and a data length which has the next largest acquisition number of times among the acquisition number of times counted in said second counting step.

8. An information processing method according to claim 5, wherein said deciding step includes deciding the pre-read quantity according to a data length which has the largest acquisition number of times among the acquisition numbers of times counted in said second counting step.

9. A memory medium storing program instructions for causing a programmable apparatus to perform an information processing method for reading data from a storage medium according to a read request, comprising:

an acquiring step for acquiring a length of the data read from the storage medium in response to the read request;

a first counting step for counting the number of the read requests;

a second counting step for counting the number of times data is acquired for each of the data lengths acquired in said acquiring step;

a deciding step for deciding a pre-read quantity based on a result supplied in said second counting step when a predetermined number of times has been counted in said first counting step; and a controlling step for performing control so that data is read in a data length obtained by adding the pre-reading quantity decided in said deciding step to the data length read in response to a read request received after the predetermined number of times.

10. A memory medium according to claim 9, wherein said deciding step further comprises determining the data length which is acquired a predetermined number of times or more in said acquiring step, the pre-read quantity being decided by a least common multiple of the data lengths determined in said determining step.

11. A memory medium according to claim 9, wherein said deciding step includes deciding the pre-read quantity according to the difference between a data length which has the largest acquisition number of times and a data length which has the next largest acquisition number of times among the acquisition number of times counted in said second counting step.

12. A memory medium according to claim 9, wherein said deciding step includes deciding the pre-read quantity according to a data length which has the largest acquisition number of times among the acquisition numbers of times counted in said second counting step.

* * * * *